Aug. 22, 1967  K. W. BINDING  3,337,155
SELF-WINDING SEAT BELT REEL
Filed March 9, 1965
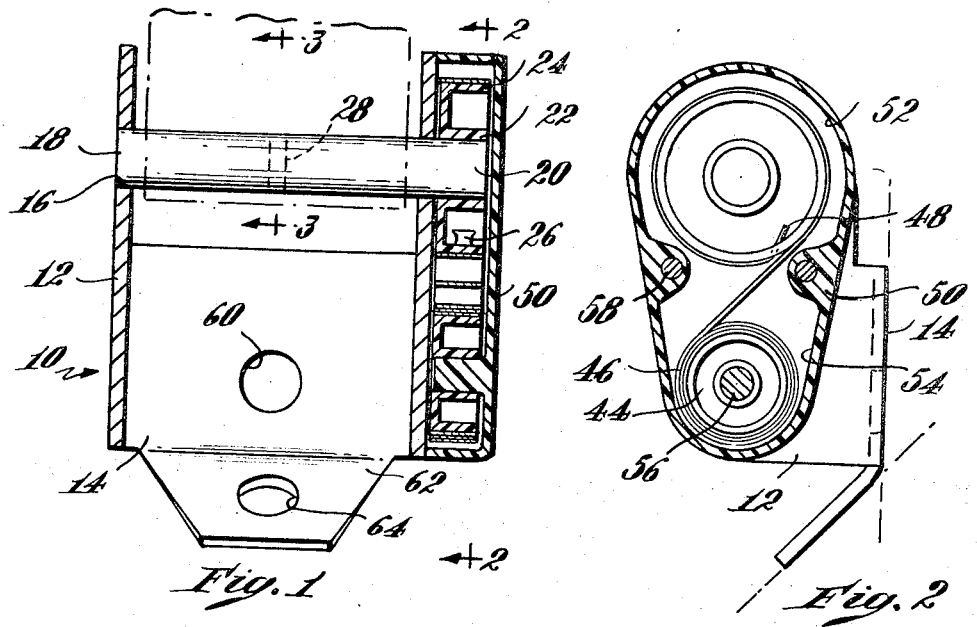
Fig. 1
Fig. 2
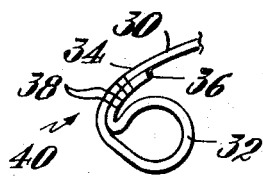
Fig. 3
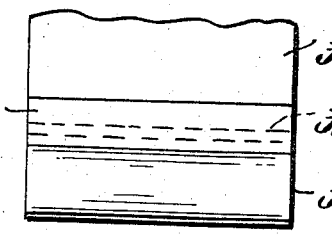
Fig. 4
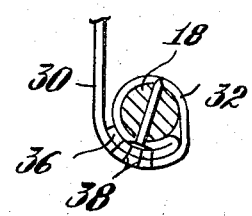
Fig. 5
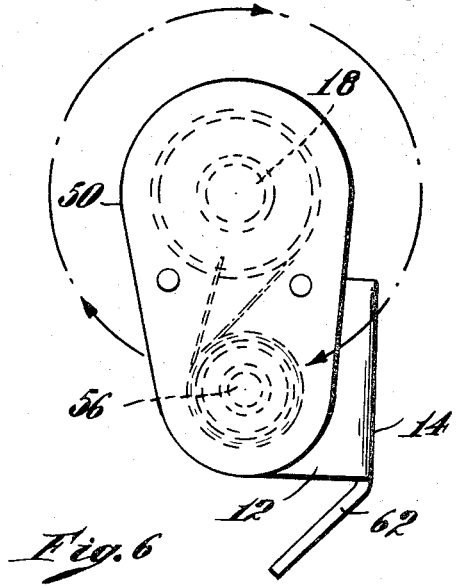
Fig. 6
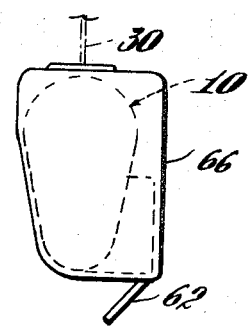
Fig. 7
INVENTOR.
Kenneth W. Binding
BY
Roberts, Cushman & Grover
ATT'YS

United States Patent Office 3,337,155
Patented Aug. 22, 1967

3,337,155
SELF-WINDING SEAT BELT REEL
Kenneth W. Binding, Winchester, Mass., assignor to Market Forge Company, Everett, Mass., a corporation of Massachusetts
Filed Mar. 9, 1965, Ser. No. 438,245
2 Claims. (Cl. 242—107)

This invention relates to reels for taking up a length of flexible material and especially to self-winding reels for holding the parts of automobile seat belts nearest the doors stored while not in use leaving the inside parts free for easy adjustment.

The principal objects of this invention are to provide a reel embodying a constant torque motor and low friction bearings which insure retraction of the belt with gentle, constant tension; to provide a reel which is durable, easy to install and meets SAE and GSA specifications; and to provide a reel which is designed for easy manufacture and assembly.

As herein illustrated, the reel comprises a rigid frame in which there are spaced bearings, a spindle supported in the bearings for receiving a belt, a belt secured at one end to the spindle, and a contsant torque motor connected to the spindle operable to wind the belt onto the spindle. The constant torque motor comprises a spool on which a prestressed spring is wound, supported adjacent a spool fixed to an end of the spindle with the spring extending from the spool on which it is wound in one or more turns about the spool fixed to the spindle in a direction to be pulled off of the spool on which it is wound when the belt is extended and to be taken up by the spool on which it is wound when the belt is released. The belt is attached to the spindle by means of a loop at one end and is characterized in that there is a molded portion adjacent the loop of concave contour adapted to receive the loop and form with it a cylindrical core.

The method of assembling the belt reel comprises providing a reel frame with spaced bearings, inserting a spindle in the bearings with one end extending from one of the bearings and with a spool fixed to the projecting end of the spindle, securing one end of a belt to the spindle and winding it thereon, providing a spool on which is wound a prestressed spring, connecting the free end of the spring to the spool on the spindle, mounting the spool on which the spring is wound on a bearing adapted to be rotated about the axis of the spindle, rotating the spool supported on the bearing about the spool fixed to the spindle in a direction to wrap one or more turns of the spring about the spool on the spindle and then fixing the bearing to the frame. A housing is employed to support the spool bearing and has two chambers for receiving the spools.

The invention will now be described in greater detail with reference to the accompanying drawings wherein:

FIG. 1 is an elevation, partly in section, of the reel;

FIG. 2 is a section taken on the line 2—2 of FIG. 1;

FIG. 3 is an edge view of a part of the belt and the loop at one end showing the premolding of the loop;

FIG. 4 is an elevation of the end of the belt and the attaching loop;

FIG. 5 is a transverse elevation of the end of the belt partly rolled up on the spindle and showing the cylindrical character of the winding;

FIG. 6 is an elevation showing the method of assembly employed for imparting initial tension to the motor; and FIG. 7 is an elevation of a boot enclosing the reel.

Referring to the drawings, the reel 10 comprises a rigid frame in which there are spaced parallel side walls 12 joined by a wall 14. The side walls contain aligned bearing openings 16 in which there is journaled a spindle 18, one end 20 of which extends through one of the walls and has on its projecting end a spool 22. The spool 22 has a peripheral surface 24 in which there is an opening 26. A belt 30 is adapted to be attached to the spindle 18 and for this purpose the spindle contains a diametrical hole 28. The belt 30 has at the end which is to be attached to the spindle a loop 32 formed by folding the belt upon itself and joining the juxtaposed portions 34 and 36 with several rows of stitching 38. To provide for a substantially cylindrical core and rolling of the belt up in the form of a nearly perfect cylinder, the juxtaposed stitched portions are impregnated with a hardenable material such as a nylon plastic and premolded as shown at 40 so as to have a curvature corresponding somewhat to the outside of the loop and so as to form in conjunction with the loop when wrapped about the spindle a nearly cylindrical core. The loop when placed upon the spindle is secured by inserting a small nail 42 through the weave of the material and through the hole 28 and then bending over the point so that it will not fall out. The belt is wound on the spindle and retracting rotation is imparted to the spindle 18 by a constant torque motor.

The motor comprises a spool 44 on which is wound a prestressed spring 46. The free end 48 of the spring is engaged within the hole 26 in the spool 24 and preferably wrapped once around the spool 24 in a direction such that pulling the belt off of the spindle 18 unwinds the spring from the spool 44. Upon release of the belt the tension developed in the spring rotates the spool 44 in a direction to rewind the spring onto it and simultaneously to wind the belt onto the spindle 18.

The spools 22 and 44 are contained within a housing or cage 50 secured to the outside wall 12. The housing is shaped to fit onto the end wall and has interior chambers 52 and 54 adapted to fit over and contain the spools 22 and 44. The chamber 54 has fixed to its inner side a pin bearing 56 on which the spool 44 is mounted. Rivets 58, eyelets or their equivalent inserted through the holes in the wall 12 and through registering holes in the housing provide for securing the latter to the wall.

The reel frame and spindle are made of cold rolled steel and the spools and housing are molded from plastic for example nylon. The belt is very closely woven nylon fabric.

The method of assembling the structure comprises first slipping the spindle 18 through the bearing 16 in one wall; then through the loop 32 in the belt end and then through the bearing 16 in the other wall; then placing the spool 44 in the chamber 54 of the housing 50, drawing off the end 48 of the spring and inserting it through the hole 26 in the spool 22; holding the open side of the housing 50 flat against the wall 12 and then as shown in FIG. 6 rotating the end of the housing containing the spool 44 in a circle about the axis of the spool 22 as a center so as to wind at least one length of the spring onto the surface of the spool 22. When the housing has been rotated through one or more full turns, the rivets or eyelets 58 are inserted through the holes in the wall and through the holes in the housing and secured.

The reel as thus constructed provides for a very uniform and constant torque which retracts the belt gently and constantly.

By forming the belt end so that the belt winds on a core which is substantially cylindrical, uniformity and smoothness in operation is insured. By using extremely simple bearings with relatively narrow bearing surfaces, friction is reduced to a minimum and by employing spools comprised of nylon which are light weight and frictionless, manufacture and assembly is made easy and without need for special jigs.

To enable attaching the reel to all kinds of vehicles, the wall 14 is provided with a hole 60 for attachment to vertical parts of the vehicles and an angularly disposed tongue 62 containing an opening 64 for attachment to inclined parts of the vehicle. The tongue 62 may be bent to a greater or lesser angle to enable fitting the device into the space available.

To cover the reel and to make its appearance less conspicuous and more attractive, a boot cover 66 comprised of a plastic or the like is slipped over the reel, the boot having a bottom opening through which the tongue 62 extends and a top opening through which the belt may be pulled.

It should be understood that the present disclosure is for the purpose of illustration only and that this invention includes all modifications and equivalents which fall within the scope of the appended claims.

I claim:

1. A reel for storing a seat belt when not in use comprising a rigid frame having spaced parallel walls, a spindle having a hole therethrough journaled in said frame between the walls with one end extending through one of the walls, said frame being provided with means for securing it to a part of a vehicle with the spindle substantially horizontal, said spindle being provided with means securing one end of the belt thereto comprising a loop formed in one end thereof by folding the belt upon itself about the spindle and joining the juxtaposed portions by stitching, said juxtaposed stitched portions being impregnated with a hardening material and premolded and a pin passing through said looped portion and into said hole in said spindle, a spool fixed to the projecting end of the spindle, said spool containing a hole in its peripheral surface, a second spool having a prestressed spring metal band coiled on its peripheral surface, and means supporting the second spool on a wall with its axis spaced from and parallel to the axis of the spindle on which the first spool is fixed and with the free end of the band engaged with the hole in its peripheral surface and wrapped about its peripheral surface at least once in a direction such that pulling the belt off the spindle winds the band from the second spool onto the first spool.

2. A reel for storing a seat belt when not in use comprising a frame, a spindle rotatably mounted on the frame and a belt wound on the spindle, means attaching an end of the belt to the spindle characterized in that the belt end attached to the spindle has a loop receiving the spindle, and juxtaposed portions adjacent the loop containing fastening means, impregnated with a stiffening material and premolded to have a concave curvature receiving the spindle and forming therewith a substantially cylindrical core about which the belt is wound when in stored condition, said ataching means further including means passing through the looped portion and the spindle.

References Cited

UNITED STATES PATENTS

| | | | |
|---|---|---|---|
| 2,953,315 | 9/1960 | Lautier et al. | 242—107.4 |
| 3,243,136 | 3/1966 | Bloom | 242—74 X |
| 3,243,232 | 3/1966 | Blaszkowski | 297—388 |
| 3,251,627 | 5/1966 | Fisher | 242—107 X |

FOREIGN PATENTS

| | | |
|---|---|---|
| 951,833 | 3/1964 | Great Britain. |

FRANK J. COHEN, *Primary Examiner.*

WILLIAM S. BURDEN, *Examiner.*